United States Patent
Schogol et al.

(10) Patent No.: US 9,015,152 B1
(45) Date of Patent: Apr. 21, 2015

(54) MANAGING SEARCH RESULTS

(75) Inventors: Vladislav Schogol, Brooklyn, NY (US); James Robert MacGill, Chatham, NJ (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/187,379

(22) Filed: Jul. 20, 2011

Related U.S. Application Data

(60) Provisional application No. 61/492,192, filed on Jun. 1, 2011.

(51) Int. Cl.
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| | | | | |
|---|---|---|---|---|
| 2003/0074353 | A1* | 4/2003 | Berkan et al. | 707/5 |
| 2008/0059508 | A1 | 3/2008 | Lu et al. | |
| 2008/0172374 | A1* | 7/2008 | Wolosin et al. | 707/5 |
| 2009/0125511 | A1* | 5/2009 | Kumar | 707/5 |
| 2009/0248663 | A1* | 10/2009 | Maniyar et al. | 707/5 |
| 2009/0299964 | A1 | 12/2009 | Cameron et al. | |
| 2009/0327260 | A1 | 12/2009 | Li et al. | |
| 2010/0153370 | A1 | 6/2010 | Gollapudi et al. | |
| 2010/0161591 | A1* | 6/2010 | Jones et al. | 707/722 |
| 2010/0287174 | A1 | 11/2010 | Yang et al. | |
| 2010/0293174 | A1* | 11/2010 | Bennett et al. | 707/759 |
| 2010/0325131 | A1 | 12/2010 | Dumais et al. | |
| 2011/0161242 | A1* | 6/2011 | Chung et al. | 705/347 |
| 2011/0167077 | A1 | 7/2011 | Govani et al. | |
| 2011/0238648 | A1 | 9/2011 | Heath et al. | |
| 2011/0289068 | A1 | 11/2011 | Teevan et al. | |
| 2012/0030226 | A1 | 2/2012 | Holt et al. | |
| 2012/0143859 | A1* | 6/2012 | Lymperopoulos et al. | 707/724 |
| 2012/0166530 | A1* | 6/2012 | Tseng | 709/204 |

OTHER PUBLICATIONS

Gan, Qingqing, et al., "Analysis of geographic queries in a search engine log," Proceedings of the first international workshop on Location and the web, ACM, 2008.*

* cited by examiner

*Primary Examiner* — Jay Morrison
(74) *Attorney, Agent, or Firm* — Marshall, Gerstein & Borun LLP

(57) ABSTRACT

Methods, systems, and apparatus, including computer programs encoded on a computer storage medium, for managing search results. In one aspect, a method includes receiving a set of search results. The set of search results is responsive to a search query received from a user. The method includes determining whether the search query is a navigational query or an exploratory query. The method also includes determining a number of search results to be presented to the user depending on whether the search query is determined to be a navigational query or an exploratory query.

18 Claims, 3 Drawing Sheets

MANAGING SEARCH RESULTS

CROSS-REFERENCE TO RELATED APPLICATIONS

This application claims the benefit of priority Under 35 U.S.C. §119(e) of U.S. Provisional Application Ser. No. 61/492,192, filed Jun. 1, 2011. The disclosure of the prior application is considered part of and is incorporated by reference in the disclosure of this application.

BACKGROUND

This document relates to managing search results.

The Internet provides access to a wide variety of resources, including video or audio files, web pages for particular topics, maps, and news articles. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

Some search systems can obtain or infer a location of a user device from which a search query was received and include local search results that are responsive to the search query. Local search results are search results that have been classified as having local significance to the particular location of the user device. For example, in response to a search query for "coffee shop," the search system may provide local search results that reference web pages for coffee shops near the location of the user device.

SUMMARY

This specification describes technologies relating to managing search results.

In general, one innovative aspect of the subject matter described in this specification can be embodied in methods that include the actions of receiving a set of search results, wherein the set of search results is responsive to a search query received from a user; determining whether the search query is a navigational query or an exploratory query; and determining a number of search results to be presented to the user depending on whether the search query is determined to be a navigational query or an exploratory query. Other embodiments of this aspect include corresponding systems, apparatus, and computer programs, configured to perform the actions of the methods, encoded on computer storage devices.

These and other embodiments can each optionally include one or more of the following features. The analysis of the particular search result can include analyzing a score associated with the particular search result, wherein the score is associated with ranking the particular search result in the set of search results and includes at least one of a title component and a category component. The method can include displaying the set of search results if the search query is not a query for a particular location. The navigational search can include a query associated with one or more particular geographic search limitations. The method can include analyzing the stored user responses by accessing a database of user responses, wherein the database of user responses include a set of stored responses to queries similar to the search query; and analyzing a degree of entropy associated with the user responses to determine whether the search query is a query for a particular location.

Particular embodiments of the subject matter described in this specification can be implemented so as to realize one or more of the following advantages. Search results that are responsive to a query can be limited to a single or small number of results near an address or a location of a user device. This allows the limited number of search results to be displayed on an online map of a town or neighborhood of a city as opposed to a map of a country or a state. Search results can be limited if a search is navigational (e.g., a search seeking a particular location or business), and a larger set of search results can be provided if the search is exploratory. In addition, displaying a limited number of search results allows more details associated with each search result to be displayed.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

In general, a search system receives search queries from a user device. In response, the search system can determine whether the search query is a query for a particular location or is a query for broad search results. The search system can analyze a score associated with one or more search results and/or can analyze user responses to search results that were previously presented in response to similar, previously presented search queries to determine if the query is for a particular location. The number of search results can be reduced if the search system determines that the query is for a particular location (e.g., a query that is likely to have only one or a limited number of results), as opposed to a search that is exploratory in nature (e.g., a search for unspecified locations even if for a particular category in a specified geographical area, such as a search for pizzerias in New York City). For example, the search system can determine that the query is for a particular destination if the search is directed to a particular business or group of businesses (e.g., "Chelsea Market"), a particular landmark (e.g., "Prospect Park"), or a particular store with three locations in different neighborhoods of a city (e.g., "Peapod's Grocery Store") and reduce the set of search results. The reduced set of search results is provided to the user device.

Figure 1:
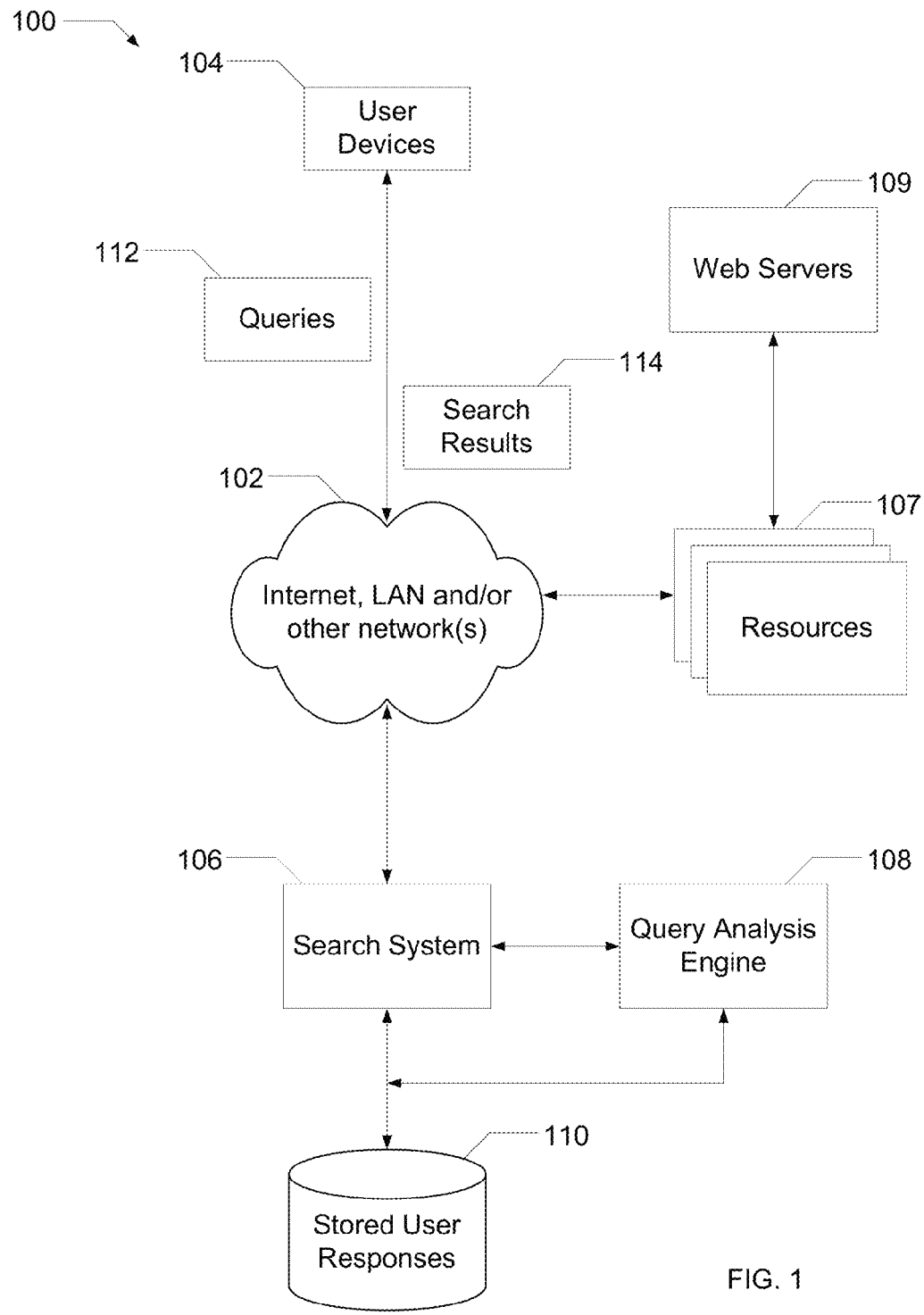
FIG. 1 is a block diagram of an example environment in which a search system manages search results.

FIG. 1 is a block diagram of an example environment 100 in which a search system manages search results. The example environment 100 includes a network 102, a user device 104, a search system 106, resources 107, a query analysis engine 108, web servers 109 and a database of stored user responses 110. Although FIG. 1 illustrates a single user device 102, multiple user devices 102 can be included in the environment 100.

The network 102 can be any type of network such as a local area network (LAN), wide area network (WAN), the Internet, or a combination thereof. The network 104 facilitates connectivity between the user device 104, the search system 106, the resources 107, and the query analysis engine 108.

The user device 104 can be any type of device capable of accessing the network 104. For example, the user device 104 can be a computer, a laptop, a tablet computer or a smart phone. The user device 104 can be used to transmit search queries 112 to the search system 106 and receive search results 114 from the search system 106. The user device 104 can display the search results 114 and allow a user to interact with the search results 114. For example, a user can click on a search result or mouse over a search result. In some implementations, the user device 104 can display the search results on an interactive map.

The search queries 112 can be queries for destinations (i.e., a geographical search query). For example, a geographical search query can be a query for particular location(s)/destination(s) (i.e., a search that is likely to only have one or limited number of results, such as a specific restaurant, a specific store, a specific park, and/or an address), or a query for locations that belong to a category of locations (e.g., restaurants, grocery stores, or bakeries). In some implementations, the geographical search query is generated in connection with an online map. In some implementations, the search query 112 can be a query for information in or around a particular area (i.e., a local search query), such as information in or around the location of the user device 104 and/or another location identified by the user device 104 or inferred from interactions made using the user device 104.

In some implementations, the search query 112 can include information associated with the location of the user device 106. For example, an IP address transmitted with the search query 112 can itself provide information about the location of the user device 106. In addition, a user may choose to include geographical information in the search query 112. For example, the user may choose to search for restaurants near a particular address/location specified by the user or the user's current address/location. In some implementations, GPS coordinates or other location identifying information, e.g., cellular tower information associated with the user device 104 can be included with the search query 112.

The resources 107 can be any data that can be provided by a web server(s) 109 and accessed by the search system 106. Resources 107 include HTML pages, word processing documents, portable document format (PDF) documents, images, video, and feed sources. The resources 107 can also include information stored in one or more databases that are accessible by the search system 106. For example, the search system 106 can access a database that stores address information, business contact information, map and directional information and/or geographical data. The resources 107 can be indexed by the search system 106.

The search system 106 can be one or more servers configured to receive search queries 112 from the user device 104. The search system 106 can access indexes storing data about the resources 107 and identify the resources 107 that are predicted to be relevant to the search query 112. For example, the search system 106 can identify resources 107 with the highest relevance scores that have been computed by the search system 106 based on the search query 112. In some implementations, the relevance scores can be used to rank the search results in order of relevance with respect to the search query 112. For example, a resource 108 with a high relevance score is more relevant to the search query 112 than a resource 108 with a low relevance score. In some implementations, the relevance score for each of the search results 114 can be based on and/or include score components for the title/name of the resource 107, a category associated with the resource 107 and/or geographical data associated with the resources 107, such as distance from the user device's location or other location provided by the user. Each component can contribute to the overall relevance score, but the relevance score is not necessarily a sum of the components.

In some implementations, the relevance score is a weighted linear combination of the component scores, where the component scores are equally weighted. However, other implementations are possible. For example, the relevance score need not be a linear combination of the component scores, and the component scores can be separately weighted. In many implementations, the overall importance of a particular component score (e.g., title/name) to the overall relevance score can be determined. For example, when the ratio of the component score to the relevance score is high, the component score is particularly important to the relevance score. When this ratio is low, the component score is not important to the relevance score. Similarly, the relative importance of each component score to the relevance score can also be determined. For example, when the ratio of a first component score to a second component score is high, the first component is much more important to the relevance score than the second component.

The search system 106 can also receive information associated with prior users who performed similar searches, such as prior users responses to search results presented in response to similar search queries that were previously submitted to the search engine. For example, the search system 106 can receive information associated with particular search results a prior user clicked on or otherwise interacted with (e.g., a mouse over). The information associated with prior user interactions with respect to search results previously presented in response to previously submitted and similar searches can be stored in the database of stored user responses 110. The database of stored user responses 110 can include information associated with multiple users that performed similar searches.

The search system 106 can provide the search query 112, the search results 114 and the relevance scores associated with the search results 114 to the query analysis engine 108. The query analysis engine 108 can determine whether the search query 112 is a navigational query (i.e., a query for a particular resource 107) or an exploratory query (i.e., a categorical search or a search for unspecified locations). For example, if search query 112 is a geographic search query or a local search query, the query analysis engine 108 can determine whether the geographic search query was intended to identify a single location (e.g., a search for "John's Pizzeria" in New York City or a search for "Beta and Eta Photo" near Midtown, New York City) or if the geographic search query was intended to identify a large number of results related to the search query (e.g., a search for "Bakery").

The query analysis engine 108 can determine whether a search query 112 is a navigational search or an exploratory search by analyzing the relevance score associated with one or more of the search results 114. For example, the query analysis engine 108 can examine the search result with the highest relevance score and compare the title/name component to the other score components to determine that the search is a navigational search. In some implementations, the query analysis engine 108 can compare the title/name component to a predetermined threshold to determine whether the search query 112 is a navigational search. In some implementations, the query analysis engine 108 can analyze the geographical component of the relevance score associated with the search result with the highest relevance score to determine whether the search query 112 is a navigational search. For example, the query analysis engine 108 can determine whether the address or location of the resource 107 is greater than a predetermined distance away from the user device 104 or a location provided by the user.

The query analysis engine 108 can also access the database of stored user responses 110 to determine whether the search query 112 is a navigational search or an exploratory search. Typically, this analysis to determine whether a query is navigational or exploratory is performed offline, rather than in real time, although real time analysis of at least some information associated with stored user responses is possible. The stored user responses 110 can be stored in any type of database or other memory accessible by the search system 106 and/or the query analysis engine 108 and can store previously received search queries 112, geographical information associated with the search queries 112 and the prior users' responses to the search results 114. For example, the stored user responses 110 can include a particular query previously received by the search system 106 (e.g., "Donny Bunko's"), the location of the user device 104 associated with the query, the search results presented to the user in response to the query, and the particular result(s) users clicked on after receiving the search results 114 on their user devices 104. The search system 106 can update the stored user responses 110 each time it receives a search query 112, each time it transmits search results 114 to the user device 102 and/or each time a user clicks on one of the search results 114. In some implementations, the search system 106 stores this information in a temporary storage or file and updates the stored user responses 110 at a later time.

The stored user responses 110 can also include entropy information associated with each search result 114 (e.g., information related to the diversity of search results that users have interacted with). The entropy information represents the number of clicks each of the search results 114 receive for a particular search query 112. In some implementations, the entropy information can be represented as a histogram of user clicks for each of the search results 114. In some implementations, the entropy information can be used by the query analysis engine 108 to determine whether the search query 112 is a navigational search. Here again, analysis of this entropy information can be performed offline and the results of the analysis can simply be accessed for use in analyzing whether a particular search query 112 is navigational or exploratory.

If the query analysis engine 108 determines that the search query 112 is a navigational search, the query analysis engine 108 can reduce the set of search results 114. For example, the query analysis engine 108 can determine that only the five search results with the highest relevance scores should be returned or that only search results with a relevance score or a component score that exceeds some relative or absolute threshold should be returned. In some implementations, the query analysis engine 108 can reduce the set of search results 114 by limiting the search results to only include search results that are within a predetermined distance (e.g., within 5 miles or within the same zip code) of the user device's location and/or a location provided by the user device 104. The query analysis engine 108 can provide the reduced set of search results 114 without reduction to the search system 106, which then provides the reduced set of search results 114 to the user device 102.

If the query analysis engine 108 determines that the search query 112 is an exploratory search, the query analysis engine 108 can provide the set of search results 114 without reduction to the search system 106, which then provides the set of search results to the user device 102.

Figure 2:
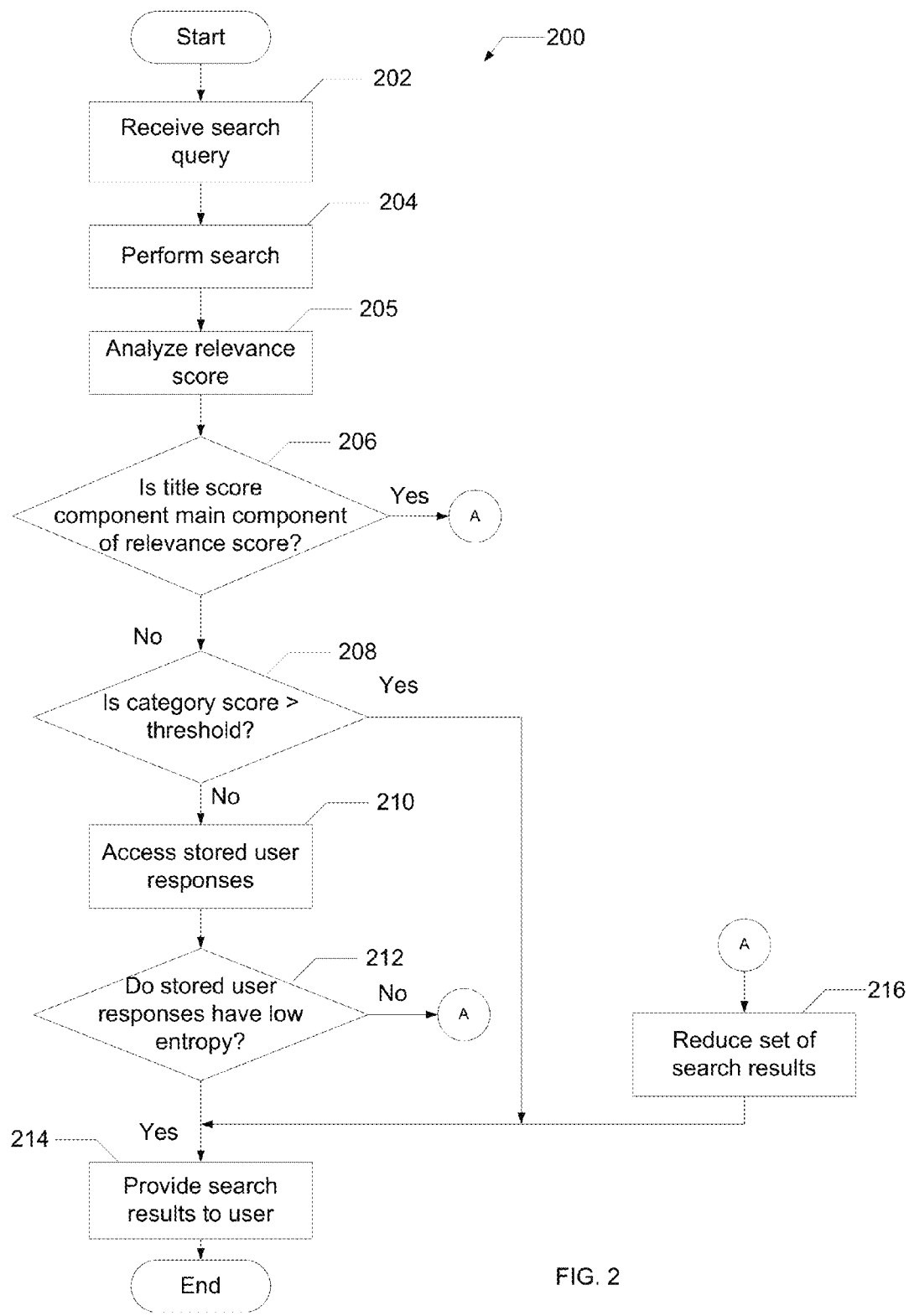
FIG. 2 is a flowchart of an example process for managing search results.

FIG. 2 is a flowchart of an example process 200 for managing search results. The process 200 begins by receiving a search query 112. For example, a search query 112 can be transmitted from the user device 104 to the search system 106.

At 204, a search is performed based on the search query. For example, the search system 106 can access the resources 107 or indexes representing the resources 107 and identify the resources 107 that are predicted to be relevant to the search query 112 based on relevance scores computed by the search system 106. The search system 106 can provide the search results 114 and the relevance scores associated with each of the search results 114 to the query analysis engine 108.

At 205, the search result 114 with the highest relevance score is analyzed to determine whether the title/name score component is the primary component of the relevance score (at 206). For example, the query analysis engine 108 can analyze the title/name score component and compare it to the category component. If the difference between the title/name score component and the category component is greater than a predetermined threshold, then the query analysis engine 108 can determine that the search query 112 is a navigational search. As another example, the query analysis engine 108 can compare the title/name score component to a predetermined threshold to determine whether the title/name score component is the main component of the relevance score. In some implementations, the title/name score can be normalized before comparing it to the predetermined threshold. For example, the normalized title/name score can be equal to the title/name score divided by the overall relevance score. The predetermined threshold can be based on the overall relevance score or the function used to calculate the overall relevance score. For example, the predetermined threshold can be based on the title/name score's contribution to the overall relevance score (e.g., a value associated with the amount the title/name score contributes to the overall relevance score relative to the other score components).

If the process 200 determines that the title/name component is the main component of the relevance score, the set of search results 114 is reduced (at 216). For example, the query analysis engine 108 can reduce set of search results 114 to only include a predetermined number of search results 114 (e.g., three results with the highest relevance score). In some implementations, the query analysis engine 108 can reduce the set of search results such that the set of search results include only resources 107 that are within a predetermined distance from the user device's location. The reduced set of search results 114 is then provided to the user device 102 (at 214).

If the title/name component is not the main component of the relevance score, then the category score component is compared to a predetermined score threshold to determine whether the category score component is the main component of the relevance score (at 208). In some implementations, the category score can be normalized before comparing it to the predetermined score threshold. For example, the normalized category score can be equal to the category score divided by the overall relevance score. The predetermined score threshold can be based on the overall relevance score or the function used to calculate the overall relevance score. For example, the predetermined score threshold can be based on the category score's contribution to the overall relevance score (e.g., a value associated with the amount the category score contributes to the overall relevance score relative to the other score components). If the category score component is greater than the predetermined score threshold, then the query analysis engine 108 can determine that the search query 112 is an exploratory search. In some implementations, the query analysis engine 108 can compare the category score and the title/name component to determine whether the category score component is greater than the title/name component. If the category score component is greater than the title/name component, than the query analysis engine 108 can determine that the search query 112 is an exploratory search. The set of search results 114 is provided to the user device 102 without reduction (at 214).

If the category score is not greater than the predetermined score threshold, then the stored user responses 110 can be accessed to determine whether the search query 112 is a navigational search (at 210). For example, the query analysis engine 108 can access the stored user responses 110 to search results that were previously provided by the search system 106 in response to a query similar to the search query 112. In some implementations, the query analysis engine 108 can access the stored user responses 110 that were provided by the search system 106 in response to a query that includes the same geographical information as the search query 112.

At 212, the entropy information associated with the stored user responses 110 is analyzed to determine the distribution of user responses to search results presented in response to queries similar to the search query 112. For example, the query analysis engine 108 can analyze the stored user responses 110 and determine if a single search result received the majority of user clicks (i.e., the stored user responses 110 have low entropy).

Figure 3A:
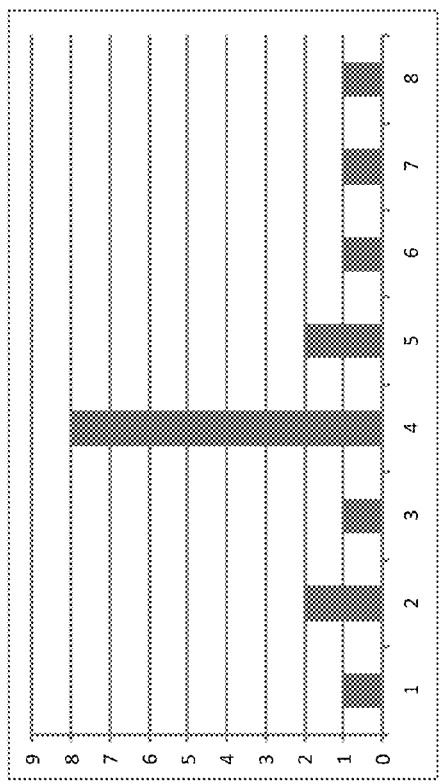
FIGS. 3A and 3B are example histograms representing entropy information associated with stored user responses.
Figure 3B:
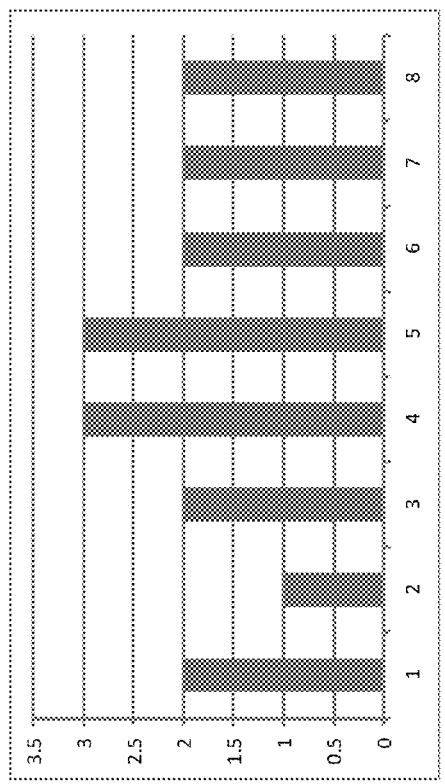

FIGS. 3A and 3B are illustrations of example entropy information having low entropy and high entropy, respectively. Each column in FIGS. 3A and 3B can represent information associated with the stored search results associated with a particular search query. For example, each column in FIGS. 3A and 3B can represent the number of user clicks each search result provided in response to a particular previously submitted search query received. Each column can be associated with a particular search result and the height of the column can represent the number of user clicks the search result received.

If the entropy information associated with the stored search results is low (i.e., the majority of user clicks are associated with one or two previously presented search results), the search results 112 are reduced (at 216) and provided to the user device 104 (at 214), since low entropy can be an indicator that search query is directed to a particular location (e.g., the location selected) and is a navigational query. If the stored search results 110 have high entropy (i.e., the user clicks were distributed across the search results), the process 200 determines that the search query 112 is an exploratory search and the search results 112 are provided to the user device 104 (at 214), since high entropy can be an indicator that the search query is not directed to a particular location and is exploratory query.

An example use case is described below. The example use case is merely for illustrative purposes and is not meant to limit the scope of the claims or disclosure.

The user device 104 can transmit a search query 112 for "Cyclone" and include GPS coordinates that indicate that the user device 104 is in Brooklyn, N.Y. The search system 106 receives the search query 112 performs the search and receives the set of search results 114 and relevance scores associated with each of the search results 114. The search system 106 then analyzes the search result with the highest relevance score and determines whether the title/name component is greater than a predetermined threshold. If the title/name component is greater than the predetermined threshold, the search system 106 determines that the query 112 is a navigational search and reduces the set of search results 114.

For example, the set of search results 114 can be reduced to the three results (or even a single result, if there is a high degree of certainty that it is the intended result) with the highest relevance scores. The reduced set of search results 114 can be provided to the user device 104.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a set of search results responsive to a search query received from a user, wherein each search result is associated with a relevance score, and wherein a relevance score comprises a combination of component scores;
identifying one or more of the search results having highest relevance scores;
determining that the search query is a navigational query and not an exploratory query based on component scores of the one or more of the search results having the highest relevance scores, wherein determining that the search query is a navigational query and not an exploratory query based on component scores, comprises:

determining whether the search query is a navigational query or an exploratory query based on whether a first component score of the search result having the highest relevance score is larger than a second component score of the search result having the highest relevance score;

determining a number of search results to be presented to the user depending on whether the search query is determined to be a navigational query or an exploratory query such that a determination of a number of search results to be presented to a user is based at least in part on component scores of one or more search results identified as having highest relevance scores of a set of search results responsive to a search query received from the user; and sending a subset of the set of search results for display in response to determining that the search query is a navigational query.

2. The computer-implemented method of claim 1, wherein the search results of the set of search results are ranked based on their respective relevance scores, and wherein the component scores comprise at least one of a title component and a category component.

3. The computer-implemented method of claim 2, wherein determining that the search query is a navigational query and not an exploratory query comprises comparing a title component of a relevance score of the one or more of the search results having highest relevance scores to a threshold.

4. The computer-implemented method of claim 2, wherein determining that the search query is a navigational query and not an exploratory query comprises comparing a category component of a relevance score of the one or more of the search results having highest relevance scores to a second threshold.

5. The computer-implemented method of claim 1, wherein determining that the search query is a navigational query and not an exploratory query comprises analyzing stored user responses, wherein the stored user responses include user selections of search results previously presented in response to a previously submitted search query that is similar to the search query.

6. The computer-implemented method of claim 5, wherein analyzing the stored user responses includes:
- determining a degree of entropy associated with user selections of the previously presented search results;
- determining that the degree of entropy is not low; and
- determining that the search query is an not exploratory search query in response to determining that the degree of entropy is not low.

7. The method of claim 1, wherein after the search query is determined to be navigational, sending a subset of the set of search results for display comprises sending a first subset of the search results to the user, and not sending a second subset of the search results corresponding to an exploratory query determination to the user, wherein the second subset of the search results is larger than the first subset of the search results.

8. A system, comprising:
one or more memories storing instructions; and
one or more processors, coupled to the one or more memories, and configured to execute the instructions stored on the one or more memories in order to:
receive a set of search results responsive to a search query received from a user, wherein each search result is associated with a relevance score, and wherein a relevance score comprises a combination of component scores;

identifying one or more of the search results having highest relevance scores;

determine that the search query is a navigational query and not an exploratory query based on component scores of the one or more of the search results having the highest relevance scores, wherein determining that the search query is a navigational query and not an exploratory query based on component scores, comprises:

determining whether the search query is a navigational query or an exploratory query based on whether a first component score of the search result having the highest relevance score is larger than a second component score of the search result having the highest relevance score; and determine a number of search results to be presented to the user depending on whether the search query is determined to be a navigational query or an exploratory query such that a determination of a number of search results to be presented to a user is based at least in part on component scores of one or more search results identified as having highest relevance scores of a set of search results responsive to a search query received from the user, wherein determine a number of search results to be presented to the user comprises:

sending a subset of the set of search results for display in response to determining that the search query is a navigational query.

9. The system of claim 8, wherein the search results of the set of search results are ranked based on their respective relevance scores, and wherein the component scores comprise at least one of a title component and a category component.

10. The system of claim 9, wherein determining that the search query is a navigational query and not an exploratory query comprises comparing a title component of a relevance score of the one or more of the search results having highest relevance scores to a threshold.

11. The system of claim 9 wherein determining that the search query is a navigational query and not an exploratory query comprises comparing a category component of a relevance score of the one or more of the search results having highest relevance scores to a second threshold.

12. The system of claim 8 wherein determining that the search query is a navigational query and not an exploratory query comprises analyzing stored user responses, wherein the stored user responses include user selections of search results previously presented in response to a previously submitted search query that is similar to the search query.

13. The system of claim 12 wherein analyzing the stored user responses includes:
- determining a degree of entropy associated with user selections of the previously presented search results;
- determining that the degree of entropy is not low; and
- determining that the search query is not an exploratory search query in response to determining that the degree of entropy is not low.

14. A computer-implemented method comprising:
receiving a search query submitted by a user;
identifying a set of search results responsive to the search query, wherein each search result is associated with a relevance score, and wherein the relevance score is based on a combination of multiple component scores;
identifying a primary search result of the set of search results, wherein the primary search result comprises a search result of the set of search results having a highest relevance score;

individually assessing one or more of the multiple component scores associated with the primary search result to determine whether the search query is a navigational or exploratory search query, wherein determining whether the search query is a navigational or exploratory search query, comprises:
  determining whether the search query is a navigational or exploratory search query based on whether a first component score of the primary search result is larger than a second component score of the primary search result, and
in response to determining that the search query is a navigational search query, providing, for display to the user, a subset of the set of search results responsive to the search query.

15. The method of claim 14, further comprising
receiving a second search query submitted by a user;
identifying a second set of search results responsive to the second search query;
identifying a second primary search result of the second set of search results, wherein the second primary search result comprises a search result of the second set of search results having a highest relevance score;
individually assessing one or more of the multiple component scores associated with the second primary search result to determine whether the second search query is a navigational or exploratory search query, and
in response to determining that the second search query is an exploratory search query, providing, for display to the user, the set of search results responsive to the second search query.

16. The method of claim 15,
wherein the multiple component scores comprise a title/name score and a category score,
wherein individually assessing one or more of the multiple component scores associated with a primary search result to determine whether the a search query is a navigational or exploratory search query comprises comparing a title/name score for the primary search result and a category score for the primary search result to one another to determine whether one of the title/name score for the primary search result and the category score for the primary search result is the main component of the relevance score for the primary search result,
wherein the search query is determined to be a navigational query in response to determining that the title/name score for the primary search result is the main component of the relevance score for the primary search result, and
wherein the second search query is determined to be an exploratory query in response to determining that the category score for the primary search result is the main component of the relevance score for the primary search result.

17. The method of claim 16, further comprising, in response to determining that neither of the title/name score for the third primary search result and the category score for the third primary search result is the main component of the relevance score for the primary search result, determining whether the search query is a navigational or exploratory search query based on historical user responses to past search queries that are similar to the received search query submitted by the user.

18. The method of claim 14, wherein individually assessing one or more of the multiple component scores associated with a primary search result comprises comparing a name score for the primary search result and a category score for the primary search result to one another.

* * * * *